Aug. 25, 1970 D. P. MAURER 3,525,235
SPRAY REFRIGERATION SYSTEM FOR FREEZE-SENSITIVE PRODUCT
Filed Nov. 25, 1968 3 Sheets-Sheet 1

INVENTOR
DAVID PAUL MAURER
BY John C. Weaver
ATTORNEY

Aug. 25, 1970     D. P. MAURER     3,525,235
SPRAY REFRIGERATION SYSTEM FOR FREEZE-SENSITIVE PRODUCT

Filed Nov. 25, 1968     3 Sheets-Sheet 3

INVENTOR
DAVID PAUL MAURER
BY
*John C. ...*
ATTORNEY

United States Patent Office

3,525,235
Patented Aug. 25, 1970

3,525,235
SPRAY REFRIGERATION SYSTEM FOR FREEZE-SENSITIVE PRODUCT
David Paul Maurer, Williamsville, N.Y., assignor to Union Carbide Corporation, New York, N.Y., a corporation of New York
Filed Nov. 25, 1968, Ser. No. 778,425
Int. Cl. F25b 19/02
U.S. Cl. 62—223                        11 Claims

ABSTRACT OF THE DISCLOSURE

A system for spray refrigeration of freeze-sensitive product to avoid freeze damage and provide more uniform refrigeration, in which a heat conductive metal extended surface member joins the thermally insulated vaporizer and overhead spray conduits, and spaced nozzles preferably communicate with the spray conduit upper portion to insure only gas phase refrigerant discharge when liquid flow is terminated.

BACKGROUND OF INVENTION

This invention relates to a method of and apparatus for improved intransit spray refrigeration of freeze-sensitive products using cryogenic liquid.

The intransit refrigeration of perishable products by spraying cold cryogenic liquid from a liquefied gas storage body into the product chamber is widely practiced as descibed in Kane et al. U.S. Pat. No. 3,287,925. Certain problems have developed when the product is freeze-sensitive such as fresh produce, e.g. lettuce which must be kept within a relatively narrow temperature range of 33° to 50° F., and when such product is to be refrigerated for a sustained period exceeding about 48 hours. Fresh produce generates internal heat due to respiration, and this heat must be removed by the refrigeration system along with the atmospheric heat unavoidably transferred into the product storage chamber. Another characteristic of many varieties of fresh produce is low density, allowing tight packing of the product chamber, i.e. a highway trailer body or railroad car, to near the ceiling without exceeding vehicle weight limitations. For some products, satisfactory intransit spray refrigeration for periods exceeding about two days can only be provided by maintaining storage temperatures closely approaching the product freezing point. However, actual freezing must be avoided as it usually causes complete deterioration and an unsalable product. Chill damage to certain fruits may occur at above freezing temperature and should be avoided.

One of these problems is variation of product temperature within the storage chamber. By way of illustration, consider the liquid nitrogen spray refrigeration of lettuce with a 37-foot long overhead spray header and a 35° F. thermostat set point. The system described in the Kane et al. patent results in large temperature gradients, both from the front to the rear of the product load and also from the top to the bottom. The front to rear product temperature differential has been as large as 15° F. with the rear end (nearest the access doors) warmer than the front (nearest to the refrigerant container). The top to bottom product temperatures have been on the order of 37° F. (top) and 50° F. (bottom), thus providing a substantial temperature variation. To a considerable extent this temperature distribution problem may be overcome by partial prevaporation of the liquid refrigerant upstream of the spray header as described and claimed in copending United States application Ser. No. 747,023, filed July 1, 1968, by J. B. Wulf entitled "Intransit Liquefied Gas Refrigeration System." However, another problem remains, that of freeze damage to the product. With high stacked fresh produce loads, freeze damage occurs with uninsulated spray headers when thermostat set points below about 40° F. are used. The freeze damage is caused by the close proximity of product to the cold conduit joining the liquid nitrogen storage container and the spray header or to the spray header itself. The natural fluid convection currents in this region above the load are very concentrated, and moreover the cold refrigerant fluid spray from the openings discharges directly onto the top layer of product boxes.

Still another problem is that during normal operation of the conventional liquid nitrogen spray system using an uninsulated spray header, large amounts of frost form on the header. This frost (often in the form of ice) can disrupt the normal desired spray patterns and cause erratic temperature control. That is, the header openings are spaced so that the discharging sprays normally encompass substantially the entire upper section of the product chamber. When frost forms on the header, some parts of the chamber tend to receive less and other parts receive more than their intended portion of refrigerant spray. Frost on the spray header may also contribute to product freeze damage by falling off onto the product. Cardboard cartons of product become soaked and deteriorate from the water resulting from ice melting during periods of non-refrigeration.

An object of this invention is to provide an improved method of and apparatus for spray refrigeration of freeze sensitive product.

Another object is to provide such method and apparatus in which the product temperature from front to rear and top to bottom of the product storage chamber is more nearly uniform.

Still another object is to provide such method and apparatus that eliminates freeze damage of the top layer of product.

A further object is to provide such method and apparatus that reduces or even eliminates frost formation on the spray header.

Other objects and advantages of this invention will be apparent from the ensuing disclosure and appended claims.

SUMMARY

In the method aspect of this invention, low-boiling refrigerant fluid is intermittently passed from a storage container through a thermally insulated discharge-vaporizer conduit and thence through spaced openings in a thermally insulated overhead spray header or conduit into a product storage chamber in response to sensing of the chamber gas temperature to maintain the chamber temperature between 33° and 50° F. The improvement includes transferring heat by gas convection from the product to heat conductive metal extended surface members joined at least to the liquid discharge-vaporizer conduit and preferably also joined to the overhead spray conduit. This heat is then transferred by solid conduction from the extended surface members to the two conduits, and finally transferred by convection from the conduits to the refrigerant fluid flowing therethrough. The heat transfers are sufficient to at least partially prevaporize the refrigerant liquid in the liquid discharge-vaporizer conduit and also maintain the average temperature of the extended surface members no more than about 25° F. below the sensed gas chamber temperature. This average temperature difference insures that virtually no freeze damage to the stored product will occur. In a preferred embodiment in which refrigerant liquid remains in the overhead spray conduit after terminating the passing of same from the storage container, only vapor from the remaining refrigerant liquid is discharged from the upper portion of the overhead spray conduit through the openings into the product storage chamber.

In one apparatus aspect, thermal insulation is provided around the liquid discharge-vaporizer conduit joined to the liquid refrigerant storage container, and of sufficient effectiveness to control heat conductance to 30–80 B.t.u. per hour per foot conduit length to the refrigerant. Heat conductive metal extended surface members are contiguously and thermally associated with the thermally insulated liquid discharge-vaporizer conduit. These extended surface members are also thermally associated with the chamber environment gas. In a preferred embodiment, the aforedescribed thermal insulation is also provided around the overhead spray conduit and heat conductive metal extended surface members are thermally associated therewith. A multiplicity of nozzles are provided each preferably joining the upper portion of the overhead conduit and containing the aforementioned spray openings.

Another apparatus aspect of the invention comprises several elements in cooperating relationship, including a storage chamber for the product, and a thermally insulated container associated with the storage chamber for holding pressurized low-boiling liquefied gas having a boiling point at atmospheric pressure below about −20° F. Thermally insulated overhead spray conduit means are positioned within the upper portion of the storage chamber and extend substantially the entire length thereof, with openings spaced along the length for discharging discrete streams of cold fluid into the storage chamber to refrigerate the product. Thermally insulated liquid discharge conduit means are joined at one end to the container and joined at the other end to the spray conduit means. Again the thermal insulation surrounding the liquid discharge-vaporizer conduit and the overhead spray conduit is of sufficient effectiveness to control heat conductance to 30–80 B.t.u. per hour per foot conduit length.

Liquefied gas flow control means are also provided including a temperature sensing element positioned within the storage chamber and a control valve operably interposed in the liquid discharge-vaporizer conduit. The control valve is connected to the temperature sensing element to be responsive to the storage chamber temperature as sensed by the element to maintain the chamber between about 35° and 50° F.

The aforementioned heat conductive metal extended surface means are also included and joined to the liquid discharge-vaporizer conduit and spray conduit means. The extended surfaces preferably comprise a first horizontal section projecting toward the longitudinal axis of the storage chamber and a vertical section projecting downwardly toward the storage chamber bottom. The outer edges of both sections are positioned in the chamber gas space.

As will be explained hereinafter in detail, this invention achieves the apparently conflicting objects of preventing freeze damage to freeze-sensitive product beneath the overhead spray conduit, yet effectively and uniformly transfers refrigeration from liquid boiling below −20° F. to the product. This refrigeration transfer is so uniform that the gas and product temperatures are nearly the same from end-to-end and top-to-bottom of the product storage chamber.

DESCRIPTION OF PREFERRED EMBODIMENTS

Figure 1:
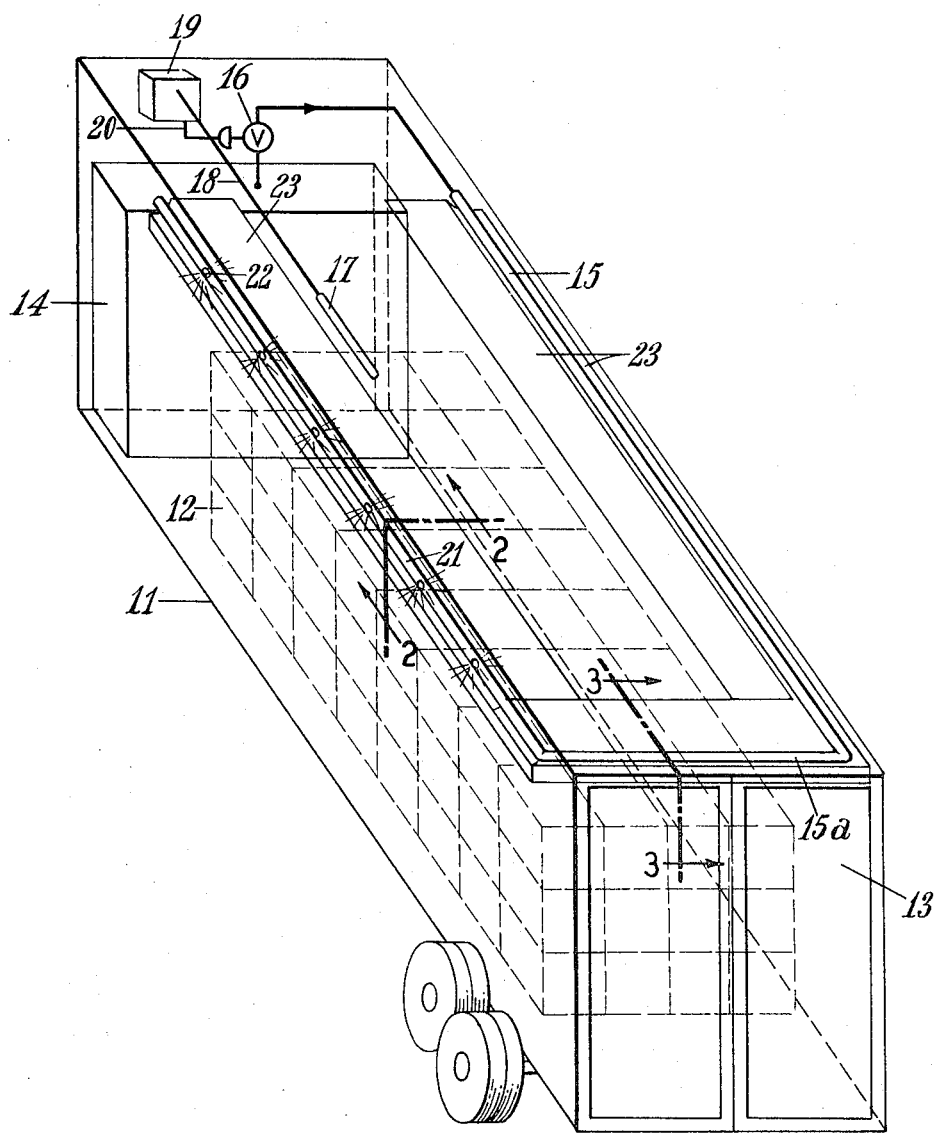
FIG. 1 is an isometric schematic view of a truck semi-trailer incorporating one embodiment of the invention.

Referring now to the drawings, FIG. 1 illustrates an embodiment in which a truck trailer body constitutes thermally insulated storage chamber 11 for holding freeze-sensitive product such as stacked boxes of lettuce 12. This chamber may be of standard construction for typical mobile refrigerated chambers, e.g. reinforced aluminum siding outer walls, plywood panelled inner walls and plastic foam insulating material between the two walls. That is, the inner wall of the storage chamber is usually constructed of low thermally conductive material. The chamber is closed to the atmosphere but need not be airtight, as access means such as rear doors 13 are needed for insertion and removal of product 12.

A double-walled thermally insulated container 14 is associated with storage chamber 11 for storing pressurized low-boiling liquefied gas having a boiling point at atmospheric pressure below about −20° F. The construction of such containers is well-known and is, for example, depicted in Loveday et al., U.S. Pat. No. 2,951,348. The container may be cylindrically-shaped or formed of flat walls in a rectangular configuration. Container 14 is depicted within storage chamber 11 but also may be positioned outside this chamber. Container 14 includes an outer shell completely surrounding an inner storage vessel to form an evacuable insulation space therebetween. This space is preferably filled with an efficient solid thermal insulating material, as for example alternate layers of radiation-impervious barriers such as aluminum foil separated by low conductive fibrous sheeting, as for example glass fibers. This particular highly efficient insulation is described in U.S. Pat. 3,007,596 to L. C. Matsch. Other suitable insulating materials include layers of aluminum coated-polyethylene terephthalate. Alternatively, powdered insulation material, as for example perlite or finely divided silica, may be employed.

To remove gases accumulating in the evacuated insulating space, an adsorbent material, as for example calcium zeolite A, or a gettering material, as for example powdered barium, may be provided therein to retain a high level of insulating quality.

Low-boiling liquefied gases which are suitable for use as refrigerants in the present invention are those which have a boiling point at atmospheric pressure below about −20° F. Examples of such liquefied gases are liquid air, liquid argon, liquid carbon dioxide, liquid helium, and liquid nitrogen. Liquid nitrogen is particularly suitable because of its inertness and relative ease of separation from air, and is preferred. While the subsequent discussion refers specifically to nitrogen, it is to be understood that all of the aforementioned gases are suitable, along with mixtures thereof. Although the primary function of storage chamber 11 is to refrigerate the product 12, the preferred liquefied gases such as nitrogen also control the atmosphere within the chamber and provide an inert blanket surrounding the product.

The vessel within storage container 14 is filled with liquid nitrogen by means well known to the prior art, such as for example connecting a source of liquid nitrogen stored at above atmospheric pressure to the container. If the liquid nitrogen is stored at a pressure below the operating pressure of container 14, a suitable pump would be employed and usually additional heat would be added to the pressurized liquid before transferring it into container 14. The liquid nitrogen is preferably charged into container 14 and stored therein at saturated conditions and at temperatures corresponding to a vapor pressure above 10 p.s.i.g. with the entire liquid and vapor substantially in equilibrium. If the aforementioned highly efficient insulation is used, there is no appreciable amount of heat inleak to the inner storage vessel of container 14 and the stored liquid nitrogen is dispensed only by this as-charged vapor pressure. Alternatively the liquid nitrogen may be charged to container 14 under non-saturated conditions and even in the subcooled state. Under these circumstances it would probably be necessary to provide means for building sufficient internal pressure on demand to discharge the liquid. Those skilled in the art will appreciate that this heat may be introduced externally, using the well-known pressure building coil. The latter includes a liquid discharge conduit, an atmospheric heat vaporizer and a conduit for returning the resulting vapor to the container gas space (not illustrated). As still another variation known to the art, a less efficient heat insulating material may be used so that sufficient atmospheric heat inleak is available to vaporize sufficient stored liquid refrigerant to form gas pressure to insure liquid discharge on demand.

It is preferred to store the liquid nitrogen refrigerant at pressure below about 100 p.s.i.g., because at higher pressures the inherent lag characteristics of temperature sensing elements limit control of the liquid refrigerant withdrawal. The storage pressure is preferably above about 10 p.s.i.g. to provide sufficient driving force for substantially uniform distribution of cold fluid through the spray orifices.

Thermally insulated liquid discharge-vaporizer conduit 15 is joined at one end to storage container 14 and has control valve 16 therein as part of a liquefied gas flow control system. The latter includes temperature sensing element 17, as for example a bulb positioned within the storage chamber 11 gas space. This bulb is connected by signal transmitting means 18 to temperature controller 19, and signal transmitting means 20 provides communication between the controller and control valve 16 in liquid discharge conduit 15. The flow control system may be electrically or pneumatically operated. Liquid discharge-vaporizer conduit 15 is preferably positioned along the entire length and width of storage chamber 11 at the upper corners thereof as illustrated in FIG. 1. Heat is transferred to the refrigerant fluid in conduit 15 as described hereinafter, and water may condense on the outer cold surface. Positioning of conduit 15 in an upper corner of chamber 11 allows condensed water to run off down the chamber side wall without wetting product 12 which may be in paperboard boxes.

The other end of liquid discharge-vaporizer conduit 15 joins thermally insulated spray conduit 21 also positioned within the upper portion of product chamber 11. Conduit 21 extends substantially the entire length of chamber 11 and has openings 22 spaced along the length for discharging refrigerant fluid therein. Conduit 21 is also preferably positioned at the upper longitudinal corner of chamber 11 opposite liquid discharge-vaporizer conduit 15 for the same reason discussed in connection with conduit 15. Openings 22 may be oriented either horizontally or slightly downwardly in the circumference of conduit 21 and preferably distributed along the conduit length to provide total area of between 0.002 and 0.009 inch$^2$ per 10 foot length of chamber as described more completely and claimed in copending application Ser. No. 776,331 filed Nov. 18, 1968, by William R. Jehle and entitled "Nitrogen Spray Refrigeration System for Perishables." The openings 22 may be of any shape although a circular configuration is preferred for uniform symmetrical discharge of refrigerant fluid spray. They preferably have an equivalent diameter of less than 0.070 inch, i.e. an area smaller than the area of a circle of this diameter. Spray holes of 0.070 inch equivalent diameter or larger would usually be so few in number and so widely separated that the individual fluid spray streams would be isolated.

Figure 2:
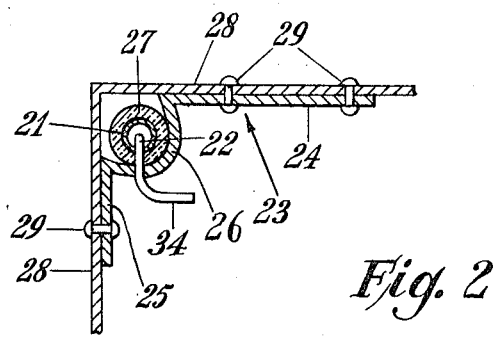
FIG. 2 is a schematic cross-sectional view of a suitable thermally insulated spray conduit-nozzle-heat conductive metal extended surface member assembly taken along line 2—2 of FIG. 1.

Extended surface members 23 constructed of heat conductive metal are joined to thermally insulated liquid discharge-vaporizer conduit 15 and spray conduit 21 in thermal association therewith and with the gas in storage chamber 11, i.e. the enviroment gas. As illustrated in FIG. 2, member 23 preferably comprises a first horizontal section 24 projecting toward the longitudinal axis of the storage chamber and a second vertical section 25 projecting downwardly toward the storage chamber bottom, with the outer edges of both sections positioned in the chamber gas space. These sections are joined by an intermediate section 26 contiguously and thermally associated with the outer surface of thermal insulation 27 surrounding overhead spray conduit 21, and preferably having the same contoured configuration thereof for efficient heat transfer by solid conduction. Sections 24 and 25 of extended surface member 23 are attached to the low thermally conductive walls 28 of product chamber 11 by suitable means, as for example rivets 29. In this manner overhead conduit 21 is positioned and supported by extended surface member 23 against an upper longitudinal corner of chamber 11.

Horizontal section 24 is preferably relatively wide and vertical section 25 of heat conductive metal extended surface member 23 is relatively narrow, as illustrated in FIG. 2. This is because the freeze-sensitive product is preferably stacked to a level immediately below but not touching the bottom edge of vertical section 25. Physical contact is avoided because a solid conduction heat transfer path would result whereby the product top layer could be quickly cooled to freezing temperature if the refrigerant flow rate was temporarily excessive. A gas space between the extended surface member 23 and the product top layer provides less efficient cooling of the product by gas convection instead of solid conduction, but reduces the criticality of refrigerant flow rate. This gas space may for example be 2–8 inches.

If vertical section 25 of extended surface member 23 were relatively wide, the permissible elevation for stacking of product would be reduced thereby reducing the product pay load. There is no such restriction on the width of horizontal section 24 because the product is not stacked to the ceiling of chamber 11 for the foregoing reason. Accordingly horizontal section 24 may be made as wide as needed to transfer the desired quantity of heat from the product to the cold fluid in conduit 21, but does not extend past the longitudinal centerline of the product chamber 11.

Although a preferred extended surface configuration has been described and illustrated in FIG. 2 in connection with thermally insulated overhead spray conduit 21, the same configuration may be contiguously and thermally associated with thermally insulated liquid discharge-vaporizer conduit 15.

Figure 3:
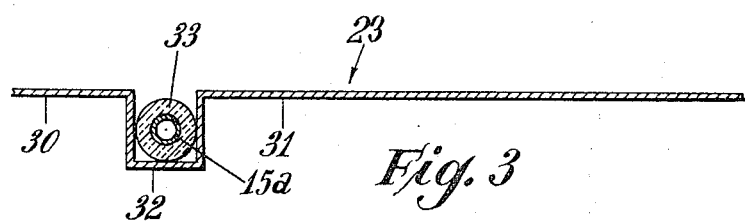
FIG. 3 is a schematic cross-sectional view of a thermally insulated liquid discharge-vaporizer conduit-heat conductive metal extended surface member assembly taken along line 3—3 of FIG. 1.

A preferred heat conductive extended surface configuration for the section of liquid discharge-vaporizer conduit 15a traversing the rear end of product chamber 11 and joining overhead spray conduit 21 is illustrated in FIG. 3. A first narrow horizontal section 30 and second wide horizontal section 31 are joined by U-shaped intermediate section 32 supporting thermally insulated liquid discharge-vaporizer conduit 15a. Thermal insulation 33 is positioned around conduit 15a and the outer surface thereof is contiguously and thermally associated with extended surface intermediate section 32 to provide a solid-to-solid conductive heat transfer path. First and second horizontal sections 30 and 31 may be joined to the roof of product chamber 11 by suitable means, as for example rivets (not illustrated).

Heat conductive metal extended surface members 23 are sized to perform their intended function, that of transferring sufficient heat from the product chamber environment gas to the liquid discharge-vaporizer conduit and overhead spray conduit to uniformly refrigerate the product from end-to-end of the storage chamber at a desired temperature level in the range of 33° to 50° F. and thereby prevent freezing the upper level of stored product. At the same time the liquid nitrogen refrigerant is at least partially prevaporized before flow into overhead spray conduit 21. As will be well understood by those skilled in the art, factors to be considered in selecting a suitable extended surface 23 include thermal conductivity, thickness, length and width.

In one embodiment successfully used in a product storage chamber 37 feet long, 7½ feet wide and 7½ feet high, the extended surface members 23 for both the liquid discharge-vaporizer conduit 15 and overhead spray conduit 21 (formed of 0.5-inch O.D. copper tubing) were formed from aluminum sheeting 0.0625-inch thick. First horizontal sections 24 were 8 inches wide and second vertical sections 25 were 2 inches wide. First horizontal section 30 of rear end extended surface member 23 was 1½ inches wide and second horizontal section 31 was 7½ inches wide.

Both thermal insulation 33 surrounding liquid discharge-vaporizer conduit 15 and thermal insulation 27 surrounding overhead refrigerant spray conduit 21 are of sufficient quality to provide heat conductance of 30 to 80 B.t.u. per hour per foot conduit length. Lower heat conductances would prevent adequate heat transfer from the product to the refrigerant for at least partial vaporization thereof. Higher heat conductances would permit sufficient heat transfer to cause possible freeze damage of the top layer of product. That is, using a cryogenic refrigerant such as liquid nitrogen would cool the extended surface members 23 sufficiently below 32° F. for convective cooling of the product chamber environment gas and thence at least the outer layer of product to near or below 32° F.

The thickness of thermal insulations 27 and 33 depends on their thermal conductivities. A very thin layer of relatively efficient thermal insulation could provide the same heat conductance as a thicker layer of less efficient material. Also, it may be preferable to employ as thermal insulation 33 surrounding liquid discharge-vaporizer conduit 15, material of lower conductance than thermal insulation 27 surrounding overhead spray conduit 21. This is because the refrigerant fluid in conduit 15 is usually colder and greater in quantity than the fluid being sprayed through openings 22 into chamber 11. Stated otherwise, more heat is usually transferred from chamber 11 into liquid discharge-vaporizer conduit 15 than into overhead spray conduit 21. Accordingly, a thinner layer of the same material may be used for thermal insulation 27, or alternatively the same thickness of a less efficient material may be employed as compared to thermal insulation 33. In the aforementioned successfully tested embodiment with 0.5 inch O.D. copper tubing as the liquid discharge-vaporizer and overhead spray conduits, the same insulation was used for both conduits, i.e. 0.5 inch I.D. by 1 inch O.D. flexible elastomer foam positioned around the conduits. The density of this insulation was 5.5–7.0 lbs./cu. ft. and its heat conductance was about 48 B.t.u./hr. ft. length.

It should be recognized that the highly efficient vacuum-type insulation system is not satisfactory for use around the liquid discharge-vaporizer and overhead spray conduits of this invention because its heat conductance is prohibitively low—on the order of 10 B.t.u. per hour per foot conduit length.

FIG. 2 also illustrates a preferred embodiment in which a nozzle 34 joins the upper portion of overhead spray conduit 21 and contains refrigerant spray opening 22. More particularly, a multiplicity of nozzles 34 are provided, each with one end inserted into the upper section of spray conduit 21 and extending through the wall thereof with the other end in the storage chamber gas space directed toward its longitudinal axis. As shown, a 90-degree elbow comprises nozzle 34.

Nozzle 34 overcomes a problem which is unique to intransit refrigeration systems for freeze-sensitive products in a chamber to be maintained at temperature between 35° and 50° F., wherein low-boiling refrigerant liquid is introduced to a thermally insulated spray conduit overhead the product. It has been found that when liquid nitrogen flow to the thermally insulated overhead spray conduit is terminated by closing control valve 16, a residual quantity of liquid remains in the conduits for an appreciable time period. This is due to the surrounding thermal insulation which retards evaporation of the liquid. If the insulation were not employed, the rate of heat transfer into the conduits would be sufficient for almost immediate vaporization of residual liquid nitrogen.

With spray openings in the lower portion of overhead conduit 21, the residual liquid nitrogen tends to drain therethrough onto the top layer of freeze-sensitive products immediately after control valve shutoff. Due to the intermittent flow characteristic of refrigerant spray systems, such liquid refrigerant drainage could be frequent. This problem has been overcome by nozzles 34 having one end joining the conduit 21 upper portion, so that only nitrogen vapor is discharged into storage chamber 11 after termination of refrigerant flow from the liquid storage container 14. Accordingly, the refrigerant vapor is discharged into chamber 11 and liquid dripping onto product with subsequent freeze damage is avoided.

In the aforementioned successfully tested embodiment, the nozzles were formed of ⅛-inch O.D. x 0.025-inch thick stainless steel tubing with a 1 1/16-inch long vertical upper section, a 90-degree bend of ⅜-inch radius, and a 3/16-inch long horizontal section at the discharge end.

Figure 4:
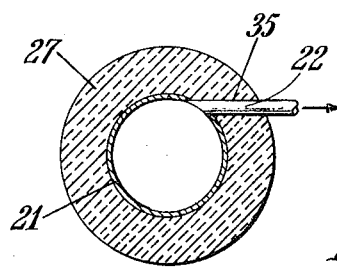
FIG. 4 is a cross-sectional end view of an alternative spray header-nozzle assembly.
Figure 5:
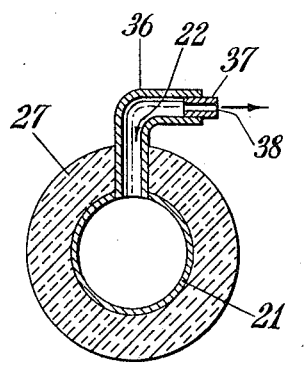
FIG. 5 is a cross-sectional end view of another alternative spray header-nozzle assembly.

FIGS. 4 and 5 illustrate alternative spray nozzle constructions. The FIG. 4 embodiment comprises a straight section of tubing 35 extending through the upper portion of the overhead spray conduit-thermal insulation assembly. The FIG. 5 embodiment is a 90-degree pipe elbow section 36 having the inner end joined to the top of conduit 21 and the outer end over the conduit facing the chamber 11 longitudinal axis. Plug 37 with small diameter hole 38 drilled therethrough is positioned in the outer end for refrigerant vapor spray discharge.

In certain spray defrigeration systems of this invention, end-to-end product chamber temperatures may be made even more uniform if a fan is provided to circulate the cooled environment gas. The fan may be electrically driven, or powered by energy from the expansion of refrigerant gas as described and claimed in copending application Ser. No. 643,709 filed June 5, 1967 issued Jan. 14, 1969 as U.S. Pat. No. 3,421,336 in the names of H. W. Lichtenberger and D. P. Maurer.

Figure 6:
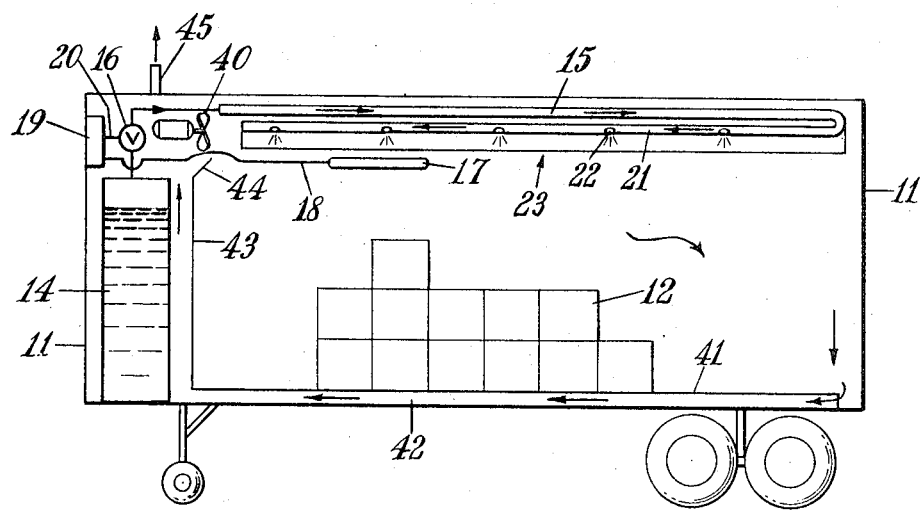
FIG. 6 is a schematic view taken in cross-sectional elevation of a railroad car embodiment incorporating a fan for improved circulation of product chamber environment gas.

FIG. 6 illustrates a railroad car embodiment in which elements corresponding to those previously described and illustrated in FIGS. 1–5 have been identified by the same numeral. Other differing elements will be described in detail. Fan 40 is positioned in the upper portion of product chamber 11 preferably at an end thereof and at about the same elevation as overhead spray conduit openings 22. As used herein the term "fan" contemplates any rotating device capable of circulating gas. Axial flow or propeller-type fans are preferred because of their lower power consumption, but centrifugal blower-type fans may also be used.

Although not illustrated, fan 40 may be powered by an electric motor from a generator. Alternatively, refrigerant gas from storage container 14 and partially warmed may be passed through a work expander such as a commercially available sliding vane-type air motor. The latter in turn may be joined by shaft coupling means to fan 40. The chamber environment gas, including a portion of the refrigerant spray which cools the recirculating gas, is circulated across the upper section of chamber 11 over product 12 to the rear end thereof and downwardly to the bottom beneath base 41.

The floor structure of commercially employed product storage chamber, e.g. truck, trailers or railcars, usually comprise channels or corrugations which are spaced apart and shaped to provide adequate structural strength and light weight, and also to provide spaces for adequate longitudinal gas circulation under the product load. Fan 40 circulates gas from end-to-end of the chamber 11 floor in passageways 42 formed by such channels or corrugations to refrigerate the lower layers of product 12. The thus-warmed environment gas rises at the chamber front end behind bulkhead 43 and is at least partially recirculated by fan 40 through duct 44 in the aforedescribed manner. The remaining gas may be discharged to the atmosphere through vent 45.

In operation according to the method of this invention, liquid refrigerant is intermittently withdrawn from container 14 through thermally insulated discharge-vaporizer conduit 15 when control valve 16 is opened responsive to the chamber gas temperature as sensed by element 17 to maintain this temperature between 33° and 50° F. The liquid is at least partly prevaporized in conduit 15 by heat convectively transferred thereto from the conduit walls. The latter are in turn warmed by solid conduction from extended surface members 23. These members receive heat by gas convection from the product 12. The heat transfers are sufficient to achieve the aforementioned partial prevaporization and to maintain the average temperature of the extended surface members no more than about 25° below the sensed chamber gas temperature. As used herein the term "average temperature" refers to the average temperature of the coldest portion of extended surface member 23 from end-to-end thereof, i.e. the portion of member 23 nearest liquid discharge-vaporizer conduit 15. The "sensed gas temperature" refers to the temperature determined by bulb 17 positioned in the product chamber gas space above the product top layer and beneath the level of spray conduit 15.

The advantages of this invention have been illustrated by shipments of lettuce from California to New York in semi-trailers equipped with nitrogen spray refrigeration systems. Certain of these systems did not include the aforedescribed heat conductive metal extended surface members. Undesirable temperature gradients were monitored from top-to-bottom and from end-to-end of the lettuce loads, and part of the top layer of lettuce was freeze damaged. In other lettuce shipments made with nitrogen spray refrigeration systems including the extended surface members and spray nozzles, freeze damage was experienced when the average temperature of the extended surface members was 30° F. below the sensed gas temperature in the product storage chamber. However when the temperature difference was reduced to 25° F. according to the method of this invention, the temperature gradients were reduced and freeze damage was eliminated.

Although preferred embodiments of this invention have been described in detail, it is contemplated that modifications of the method and apparatus may be made and that some features may be employed without others, all within the spirit and scope of the invention. For example, the invention may be used for stationary refrigeration systems as well as in-transit systems.

What is claimed is:

1. In apparatus for spray refrigeration of freeze-sensitive product in a storage chamber including a container for holding low-boiling refrigerant liquid, a liquid discharge-vaporizer conduit within said storage chamber joined to said container and an overhead spray conduit having spaced openings for intermittent refrigerant spraying into said product storage chamber to maintain the chamber temperature between 33° and 50° F., the improvement comprising: thermal insulation completely enclosing said liquid discharge-vaporizer conduit of sufficient effectiveness to control heat conductance to 30–80 B.t.u. per hour per foot conduit length, and heat conductive metal extended surface members joined to the outer surface of said thermal insulation of the thermally insulated liquid discharge-vaporizer conduit in thermal association therewith and with the chamber environment gas.

2. In apparatus for spray refrigeration of freeze-sensitive product in a storage chamber including a container for holding low-boiling refrigerant liquid, a liquid discharge-vaporizer conduit within said storage chamber joined to said container and an overhead spray conduit having spaced openings for intermittent refrigerant spraying into said product storage chamber to maintain the chamber temperature between 33° and 50° F., the improvement comprising: thermal insulation completely enclosing said liquid discharge-vaporizer conduit and said overhead spray conduit of sufficient effectiveness to control heat conductance to 30–80 B.t.u. per hour per foot conduit length, and heat conductive metal extended surface members joined to the outer surface of said thermal insulation of the thermally insulated liquid discharge-vaporizer conduit and the overhead spray conduit in thermal association therewith and with the chamber environment gas.

3. In apparatus for spray refrigeration of freeze-sensitive product including a container for holding refrigerant liquid, a liquid discharge-vaporizer conduit within said storage chamber joined to said container and an overhead spray conduit joined to said liquid discharge-vaporizer conduit with spaced openings for intermittently spraying refrigerant fluid into a product storage chamber to maintain the chamber temperature between 33° and 50° F., the improvement comprising: thermal insulation completely enclosing said liquid discharge-vaporizer conduit and said overhead spray conduit of sufficient effectiveness to control heat conductance to 30–80 B.t.u. per hour per foot conduit length, heat conductive metal extended surface members joined to the outer surface of said thermal insulation enclosing said liquid discharge-vaporizer conduit and said overhead spray conduit in thermal association therewith and with the chamber environment gas, and a multiplicity of nozzles each joining the upper portion of said overhead spray conduit and said storage chamber for discharge of refrigerant vapor into said storage chamber.

4. Apparatus for intransit spray refrigeration of freeze-sensitive product, comprising:
   (a) a storage chamber for said product;
   (b) a thermally insulated container associated with the storage chamber for cold pressurized low-boiling liquefied gas having a boiling point at atmospheric pressure below about —20° F.;
   (c) thermally insulated liquid discharge-vaporizer conduit means positioned within the upper portion of said storage chamber being joined at one end to said container and extending substantially the entire length of said storage chamber, the thermal insulation being of sufficient effectiveness to control heat conductance to 30–80 B.t.u. per hour per foot conduit length;
   (d) thermally insulated spray conduit means joined at one end to the other end of said liquid discharge-vaporizer conduit positioned within the upper portion of said storage chamber and extending substantially the entire length thereof with openings spaced along the length for discharging discrete streams of cold fluid into the storage chamber to refrigerate said product, the thermal insulation being of sufficient effectiveness to control heat conductance to 30–80 B.t.u. per hour per foot conduit length;
   (e) liquefied gas flow control means comprising a temperature sensing element positioned within said storage chamber and a control valve operably interposed in said liquid discharge-vaporizer conduit being connected to said temperature sensing element to be responsive to the storage chamber temperature as sensed by such element to maintain said chamber between 33° and 50° F.;

(f) first heat conductive metal extended surface means joined to said liquid discharge-vaporizer conduit means in thermal association therewith and with the storage chamber environment gas, extending the length of said liquid discharge-vaporizer conduit means; and (g) second heat conductive metal extended surface means joined to said spray conduit means in thermal association therewith and with the storage chamber environment gas.

5. Apparatus according to claim 4 including a multiplicity of longitudinally spaced nozzles each having one end in the upper portion of said spray conduit means and the other end in the chamber gas space and extending through the wall of said thermally insulated spray conduit means and containing a spray opening for discharge of refrigerant vapor into said storage chamber.

6. Apparatus according to claim 4 in which the first and second heat conductive metal extended surface means each comprise a horizontal section projecting toward the longitudinal axis of said storage chamber and a vertical section projecting downwardly toward the storage chamber bottom, the outer edges of both sections being positioned in the chamber gas space.

7. Apparatus according to claim 4 in which said thermally insulated liquid discharge-vaporizer conduit is positioned along the length of said storage chamber at an upper corner thereof and said thermally insulated spray conduit means is longitudinally positioned at the upper corner opposite to said liquid discharge-vaporizer conduit; and a multiplicity of nozzles are provided each with one end in the upper section of the spray conduit means extending through the wall thereof and with the other end in the storage chamber gas space directed toward the longitudinal axis thereof and containing an opening for discharge of refrigerant vapor into the storage chamber.

8. Apparatus according to claim 7 in which 90-degree elbows comprise said nozzles.

9. Apparatus according to claim 7 in which the first and second heat conductive metal extended surface means each comprises relatively wide horizontal sections joined respectively to said liquid discharge-vaporizer conduit and said spray conduit means and projecting towards the storage chamber longitudinal axis, and relatively narrow vertical sections joined respectively to said liquid discharge-vaporizer conduit and said spray conduit means and projecting downwardly toward the storage chamber bottom, the outer edges of such sections being positioned in the chamber gas space.

10. Apparatus according to claim 1 in which a fan is positioned within the upper portion of said storage chamber at an end thereof.

11. Apparatus for intransit refrigeration of freeze-sensitive product comprising:

(a) a storage chamber for said product;

(b) a thermally insulated container associated with the storage chamber for storing cold pressurized low-boiling liquefied gas having a boiling point at atmospheric pressure below about —20° F.;

(c) thermally insulated liquid discharge-vaporizer conduit means joined at one end to said container and positioned along the entire length of said storage chamber at an upper corner thereof with the thermal insulation being of sufficient effectiveness to control heat conductance of 30–80 B.t.u. per hour per foot conduit length;

(d) thermally insulated spray conduit means joined to the other end of said vaporizer conduit means and positioned along the entire length of said storage chamber at the upper corner opposite to said liquid discharge-vaporizer conduit means with the thermal insulation being of sufficient effectiveness to control heat conductance to 30–80 B.t.u. per hour per foot conduit length, and a multiplicity of 90-degree elbow nozzles longitudinally spaced from each other with one end in the upper section of said spray conduit means extending through the wall thereof and with the other end in the storage chamber gas spaced directed toward the longitudinal axis thereof for discharge of refrigerant vapor into the chamber;

(e) first heat conductive metal surface means joined to and extending the length of said liquid discharge-vaporizer conduit means in thermal association therewith and with the storage chamber environment gas, comprising a relatively wide horizontal section projecting from the conduit toward the longitudinal axis of the chamber and a relatively narrow vertical section projecting downwardly toward the storage chamber bottom with the outer edges of both sections positioned in the chamber gas space;

(f) second heat conductive metal extended surface means joined to and extending the length of said spray conduit means in thermal association therewith and with the storage chamber environment gas, comprising a relatively wide horizontal section projecting from the conduit toward the longitudinal axis of the chamber and a relatively narrow vertical section projecting downwardly toward the storage chamber with the outer edges of both sections positioned in the chamber gas space; and (g) a fan positioned within the upper portion of said storage chamber at an end thereof.

References Cited

UNITED STATES PATENTS 3,447,334   6/1969   Kimball _____ 62—64

WILLIAM E. WAYNER, Primary Examiner

U.S. Cl. X.R.

62—373, 45

PO-1050
(5/69)

UNITED STATES PATENT OFFICE
CERTIFICATE OF CORRECTION

Patent No. 3,525,235.            Dated     August 25, 1970

Inventor(s)  D. P. Maurer

It is certified that error appears in the above-identified patent and that said Letters Patent are hereby corrected as shown below:

Claim 11 (c), line 6, delete "of" and substitute --to--.

SIGNED AND
SEALED
NOV 17 1970

(SEAL)
Attest:
Edward M. Fletcher, Jr.
Attesting Officer

WILLIAM E. SCHUYLER, JR.
Commissioner of Patents